United States Patent Office 3,452,183
Patented June 24, 1969

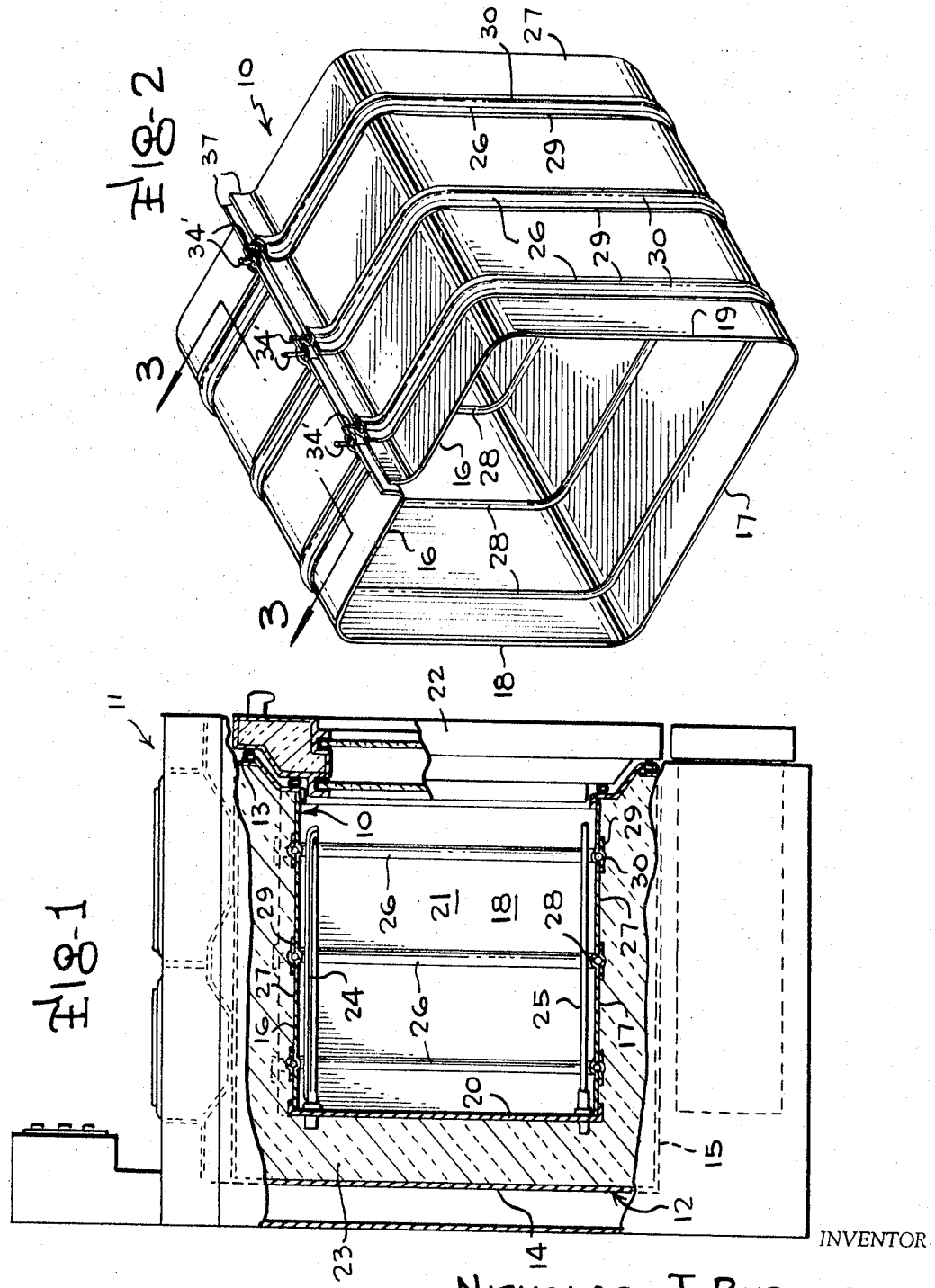

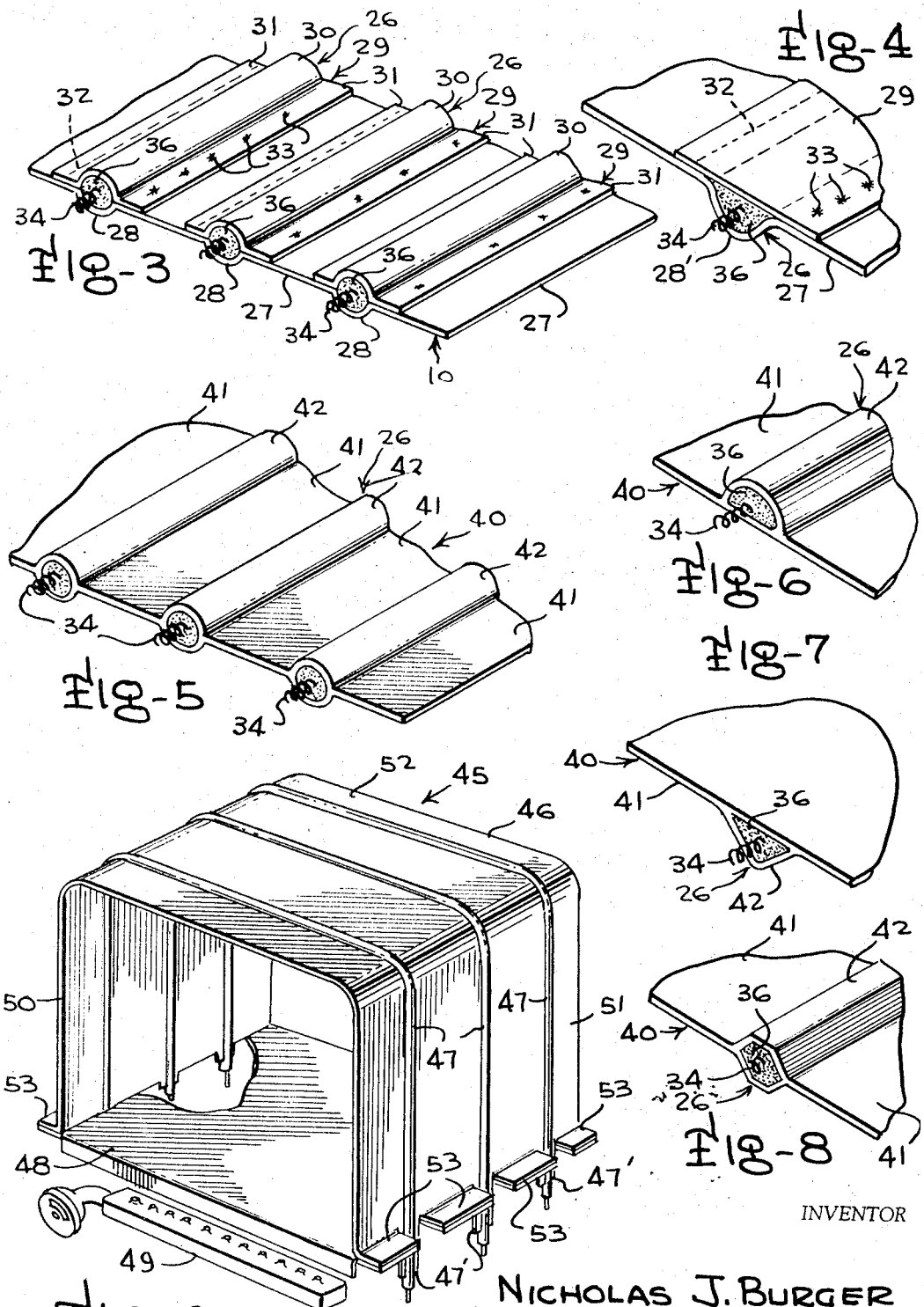

3,452,183
COMPOSITE OVEN LINER AND HEATING ELEMENT STRUCTURE FOR SELF-CLEANING OVENS
Nicholas J. Burger, Silver Spring, Md., assignor to Electro-Therm, Inc., Laurel, Md., a corporation of Maryland
Filed Apr. 12, 1967, Ser. No. 630,411
Int. Cl. A21b 1/22; F27d 11/02
U.S. Cl. 219—406
4 Claims

ABSTRACT OF THE DISCLOSURE

A composite oven liner and heating element structure for self-cleaning ovens of the electrically heated or gas heated types, wherein the inner oven liner is formed of a metallic sheet-like structure to define at least three walls of the oven cavity. The sheet-like structure includes thin integral web portions interrupted by elongated parallel tubular conduit formations housing electric resistance elements and compacted electrically insulating material and defining heat-cleaning sheathed heaters wherein the tubular conduit formation of the sheet-like structure form the sheaths thereof.

---

The present invention relates in general to ovens for cooking appliances, and more particularly to oven liners for domestic range ovens of the self-cleaning type, wherein food soils accumulated on the interior surfaces of the inner oven liner are removed in situ by heating the liner over a short period of time to a temperature range elevated well above the normal food cooking temperature range.

Heretofore, self-cleaning ovens have been devised and commercially marketed, wherein electrical heating elements and control circuits therefor are provided to elevate the temperature of the inner oven liner for domestic cooking ranges and the like to temperatures of the order of about 750° F. to about 950° F., well above the normal food cooking temperature range of about 150° F. to about 550° F., to degrade the food soils which accumulate on the interior surface of the oven liner during cooking operations and produce gaseous degradation products from the food soils which are exhausted to the exterior of the oven cavity, to thereby effect automatic and rapid self-cleaning of the oven. A typical example of such a self-cleaning oven system is disclosed in U.S. Patent No. 3,121,158, granted to Bohdan Hurko on Feb. 11, 1964. Such self-cleaning cooking ovens, as disclosed in that patent, employ the usual upper or broil heating element and lower or bake heating element within the oven cavity defined by the inner metallic liner, together with a third self-cleaning heating element which is a separate structure from the liner extending in a single substantially closed loop around the exterior of the oven liner immediately adjacent the door end thereof. During normal cooking operations in the normal food cooking temperature range extending from about 150° F. to about 550° F., the lower bake heating element, or the upper broil heating element, or both, are energized by appropriate control circuits to supply heat to the oven cavity appropriate for such normal food cooking temperatures. Control circuitry is also provided to supply electrical current to the lower bake heating element and to the self-cleaning heating element, usually at a higher voltage, at appropriate times to elevate the temperature of the inner oven liner to the temperature range from about 750° F. to about 950° F. for a selected period of time to effect the heat-cleaning of the oven.

An object of the present invention is to provide a novel oven liner construction for the inner liner of self-cleaning ovens in domestic ranges and similar cooking appliances which simplifies the incorporation of heat-cleaning of food soils from the interior surface of the oven liner.

Another object of the present invention is the provision of a novel composite oven liner construction having self-cleaning heating elements incorporated or integrated in the inner liner structure as a unitary, factory fabricated construction which eliminates the necessity of adding self-cleaning heating elements as separate components to an oven liner.

Another object of the present invention is the provision of a novel composite heating-cleaning oven liner construction for domestic range ovens and the like, wherein the oven liner sheet stock has incorporated therein a plurality of tubular conduits extending in selected paths entirely surrounding the oven cavity defined by the liner, each of the conduits being loaded with heat generating resistance wire conductors and compacted insulating material to form a plurality of sheathed heating elements, at least portions of the sheaths of which are defined by the liner sheet.

Another object of the present invention is the provision of a composite oven liner and heating element structure suitable for use as a heat-cleaning oven liner for electric or gas ranges.

Other objects, advantages and capabilities of the present invention will become apparent from the following detailed description taken in conjunction with the accompanying drawings illustrating preferred embodiments of the invention.

In the drawings:

FIGURE 1 is a somewhat diagrammatic vertical section view of a domestic electric range having an inner oven liner constructed in accordance with the present invention, only those portions of the electric range construction being illustrated which are necessary to an understanding of the invention;

FIGURE 2 is a front perspective view of the composite oven liner and heating element structure formed into a tubular surround for use as an oven liner, shown separate from the electric range with which it is to be associated;

FIGURE 3 is a fragmentary perspective view of a portion of the composite inner oven liner structure showing the construction of the heating element formations incorporated therein, when cut along the section line 3—3 of FIGURE 2;

FIGURES 4, 5, 6, 7 and 8 are fragmentary perspective views similar to FIGURE 3, showing alternate constructions of the oven liner structure, and FIGURE 9 is a perspective view similar to FIGURE 2, showing the composite oven liner structure shaped for use as a gas-heated oven liner.

Referring to the drawings, wherein like reference characters designate corresponding parts throughout the several figures, and particularly to FIGURES 1 and 2, the novel composite oven liner and heating element structure of the present invention, indicated generally by the reference character 10, is illustrated in FIGURE 1 in installed condition in a conventional domestic electric range having appropriate electrical circuitry for heat-cleaning operation to establish sufficiently high temperatures in the oven cavity to effect removal of the food soils accumulated on the interior surface of the oven liner at appropriate intervals. The electric range with which the oven liner is to be associated is indicated generally by the reference character 11 and comprises the usual upstanding substantially box-like metal body 12 in the form of a shell or casing having a front wall 13, a rear wall 14, a bottom wall 15, and side walls (not shown). It will be understood that air flow spaces may be provided outwardly of the rear wall 14 and the side walls in the usual manner, between these side and rear walls and exterior walls of the range, to facilitate cooling.

The oven liner 10 is formed into a rectangular tubular surround, illustrated in FIGURE 2, defining top wall 16, bottom wall 17, and side walls 18, 19 of the oven, and is associated with a single flat panel of sheet metal forming the rear wall 20 to complete a box-like oven cavity 21. A front opening is provided in the front wall 13 of the range body 12, aligned with the front opening in the oven liner 10 for access into the oven cooking cavity, this being closed by the usual oven door 22 and suitable gasketing to seal the peripheral regions of the door against the front wall 13. The usual heat insulation is provided between the walls of the oven liner structure 10 and the corresponding walls of the range body 12, and between the rear wall panel 20 and the rear wall 14, for example, in the form of batts of fibrous glass indicated generally by the reference character 23, arranged in compression between the liner top 16 and the top wall of the body 12, between the liner bottom wall 17 and the body bottom wall 15, between the side walls 18, 19 of the liner and their associated range body side walls, and between the rear wall 20 and the body rear wall 14.

The usual upper or broil electric heating element 24 may be removably disposed in the upper portion of the oven cavity 21 adjacent the liner top wall 16 and the usual lower or bake electric heating element 25 may be removably disposed in the lower portion of the oven cavity 21 adjacent the liner bottom wall 17, controlled in the ordinary manner to establish the proper normal cooking temperatures in the oven cavity within the temperature range of about 150° F. to about 550° F.

In order to effect heat-cleaning of the food soils from the interior surface of the oven liner 10, the temperature of the liner 10 must be elevated to heat-cleaning temperatures of about 750° F. to about 950° F., as has been previously described. This is accomplished in a simple manner in the oven liner construction of the present invention by the incorporation of a plurality of heating element formations 26 generally resembling conventional sheathed electric heating elements in the walls of the oven liner, but wherein the oven liner walls themselves form at least a portion of the sheath for the heating element formations 26. To this end, the oven liner walls forming at least the top, bottom and side walls of the liner are constructed from a thin metal sheet provided with a plurality of elongated tubular conduits or bores extending in any desired direction, along substantially parallel axes arragned in planes disposed, for example, either perpendicular to the fore and aft axis of the oven cavity or parallel to that fore and aft axis.

In the construction illustrated in FIGURES 1, 2 and 3, the top, bottom and side walls of the oven liner 10 may be conveniently formed of an elongated inner liner sheet, indicated by the reference character 27, which is of the same width as the fore and aft dimension of the oven cavity, in the form of a generally planiform web interrupted by a plurality of substantially semi-circular, convex channel formations 28 protruding from the face designed to form the interior surface of the oven liner, extending along parallel longitudinal axes for the length of the sheet 27. The concave channels thus defined in the exterior surface of the sheet 27 are closed by individual narrow outer cover strips of sheet metal 29 having outwardly projecting, substantially semi-circular, longitudinal convex channel formations 30 therein to mate with the channel formations 28 and form therewith substantially circular cross section, elongated tubular conduits. The channel formations 30 of the cover strips 29 are, in the illustrated example, flanked by narrow, planiform lateral flanges 31 lying in a common plane which are secured to the exterior surface of the inner liner sheet 27 in a suitable manner. For example, the lateral flanges 31 of the cover strips 29 may each be seam welded to the inner liner sheet 27, or, it is adequate to merely seam weld one flange 31 of each of the cover strips 29 to the sheet 27, as indicated by the seam weld 32, and the other flange 31 of each strip 29 can merely be spot welded at longitudinally spaced locations to the sheet 27, as indicated by spot welds 33.

After assembly of the inner liner sheet 27 and the cover strips 29, the conduits or tubes defined by the convex channel formations 28 and 30 are then formed into heating elements similar to conventional sheathed electric heating elements, by disposing helical resistance wires 34 within the conduits thus defined, with the usual terminal pins 34' joined as by welding to the opposite ends of the resistance wire and projecting from the opposite ends of the conduits, plugging one end of the conduits by the usual plugs on one of the terminal members of the resistance wires, and loading the conduits with the usual granular insulating material 36, such, for example, as magnesium oxide or aluminum oxide. The end of the conduits through which the inslating material was introduced is then plugged to close the same, and the insulating material is compacted within the conduits, in the usual manner, such as by pressing the convex channel formations 28, 30 between dies, or rolling or swaging them to deform them inwardly toward the center of the conduits to attain the desired compaction of the insulating material.

The resultant product is an elongated composite sheet of the width corresponding to the desired fore and aft dimension of the oven cavity having a plurailty of elongated heating element formations 26 extending the length thereof along parallel longitudinal axes, spaced widthwise of the sheet at substantially uniform intervals, which heating element formations 26 are similar to conventional sheathed electric resistance heating elements with the sheaths thereof being formed by the registering or mated convex portions 28 of the inner liner sheet 27 and the convex portions 30 of the outer cover strips 29. The oven liner 10 is then shaped from a length of this composite oven liner sheet and integrated heat-cleaning heating element structure corresponding to the perimeter of the desired oven liner by bending, wrapping or forming the composite oven liner sheet into a rectangular cross section tubular surround about an axis transverse or perpendicular to the longitudinal axis of the sheet, for example, about a suitable mandrel, former or frame, to define the sides, top and bottom of the oven liner 10. The opposite ends of this surround formed by the composite oven liner sheet may be joined in any desired manner, as by bending the longitudinal ends of the composite sheet to provide narrow end flanges 37 projecting in corresponding directions to be butted against each other, for example, at the center of the top wall 16 defined by the composite sheet, and spot welding or otherwise securing these end flanges 37 rigidly together. The terminal pins 34' conductively joined to the resistance wires 34 in the heating element formations 26 project in exposed relation beyond the end flanges 37 for connection in a suitable manner to electrical leads extending to the conventional control circuits and power source. The rear wall 20 of the oven liner closing the rear opening defined by the surround formed from this composite sheet is welded or otherwise secured adjacent its periphery to the rear edges of the surround and may, if desired, be provided with peripheral flanges to project into outwardly overlapping relation to the rear edge portions of the surround.

Other cross sectional shapes, of course, may be provided for the heating element formations 26 by a suitable selection of the cross sectional configuration of the channel formations defined in either or both of the inner liner sheet 27 and the outer cover strips 29. For example, the sheath portion of the heating element formations 26 defined by the inner liner sheet 27 and outer cover strips 29 may be of substantially triangular cross section, as illustrated in FIGURE 4, by providing substantially V-shaped channel formations 28' in the inner liner sheet 27, and leaving the outer cover strips 29 flat, or a substantially semi-circular or isosceles trapezoidal cross sectional configuration may be provided by producing the channel formation in the inner liner sheet 27 of a semi-circular or truncated V-shape configuration.

It will also be apparent that the outer cover strips 29 need not be a plurality of narrow strips respectively associated with each of the heating element formations 26, but may, if desired, be formed of a single cover strip coextensive with the inner liner sheet 27, shaped in the manner desired to provide flattened surfaces at the outer side of the heating element formations or outwardly projecting channels, the single outer cover strip being secured to the inner liner sheet 27 at opposite sides of each of the heating element formations in the same manner described in connection with the plurality of outer cover strips 29.

The surround or wrap-around type of inner oven liner with integrated heat-cleaning heating element which is the subject of the present invention may also be conveniently formed from extruded liner stock in the form illustrated in FIGURES 5, 6, 7 and 8, designated generally by the reference character 40, having thin, sheet-like web portions 41 over the major extent thereof collectively defining a width for the liner stock corresponding to the fore and aft dimensions of the desired liner or oven cavity, interrupted at selected locations by longitudinally extending tubular conduit portions 42 of appropriate cross section. For example, the extrusion stock may be formed of aluminum alloy, having a wall thickness of any desired thickness for the oven liner, for example, a thickness of about .035 inch, and the tubular conduit portions 42 may be of circular cross section, as illustrated in FIGURE 5, having an outer diameter of, for example, about ⅜ inch. Similarly, the tubular conduit portions 42 may, if desired, be of semi-circular cross section, as illustrated in FIGURE 6, or of substantially triangular cross section, as illustrated in FIGURE 7, or of hexagonal cross section, as illustrated in FIGURE 8, or any other desired cross sectional configuration. In either case, the extruded liner stock 40 is cut to a length equal substantially to the perimeter of the inner liner surround to be formed thereby, and is loaded with the helical resistance wire having terminal pins conductively connected with the ends thereof, and the granular insulating material, and the sheath defining portions of the extruded stock are then pressed, rolled, swaged or otherwise deformed to reduce the size of the bore defined thereby and compact the insulating material contained therein. Alternatively, the tubular conduit portion of the extruded liner stock 40 may be of initially circular or semi-circular cross section, as illustrated in FIGURES 5 and 6, and the necessary compaction of the granular insulating material may be achieved by changing the cross section of the tubular conduit portions, such as by pressing or rolling the initially circular cross section conduit portions to substantially semi-circular or hexagonal configurations similar to those illustrated in FIGURES 6 and 8, or to other desired non-round configurations, or initially semi-circular conduit portions, such as illustrated in FIGURE 6 may be deformed, after loading of the same, to substantially triangular cross section, as illustrated in FIGURE 7, or to isosceles trapezoidal cross section configuration, or other desired cross sectional configurations which effect a reduction in the interior size of the bores defined by the conduit portions.

The composite oven liner and integrated heat-cleaning heating element construction of the present invention may also be advantageously employed to provide electrical heat-cleaning of ovens for domestic gas ranges and gas heated cooking ovens. Adaptation of the composite oven liner construction to such gas range cooking oven applications is illustrated somewhat diagrammatically in FIGURE 9, wherein the composite oven liner and heating element stock, indicated by the reference character 45, is of the same construction as the previously described embodiments of FIGURES 3, 4, 5, 6, 7 and 8, formed of an elongated web-like sheet 46 over its major portion, interrupted by a plurality of longitudinally extending tubular conduit portions 47, defining heating element formations like the heating element formations 26. However, in gas range applications, the bottom wall of the oven, indicated by the reference character 48 in FIGURE 9, is a conventional panel of sheet material forming the impingement wall for the gas flame, a conventional gas burner or burners indicated diagrammatically at 49, having the usual flame ports therein, being provided below the bottom flame impingement wall 48, in accordance with the customary practice in construction of gas heated ovens. In such a gas heated oven application, the composite oven liner stock 45 is formed into a substantially inverted U-shaped hood-like surround, defining side walls 50 and 51 and top wall 52 of the oven cavity. The lower edge portions of the side walls 50 and 51, formed by the oven liner stock 45, may be conveniently secured to the bottom wall 48 by providing oppositely projecting flanges 53, extending outwardly from the center axis of the oven cavity at the lower ends of the side walls, to be welded or otherwise secured to the bottom wall 48. Such flanges 53 may be conveniently formed from the oven liner stock 45 by making short cuts in the transverse edges of the web portions 46 of the oven liner stock 45, extending longitudinally of the stock and located in spaced laterally flanking relation to each of the conduit portions 47, and bending outwardly the intervening web portions lying between the cuts to define the flanges 53. The remaining portions of the oven liner stock defining the conduit portions 47 flanked by the cuts formed in the web portions 46 continue downwardly below the plane of the flanges 53 as extensions of the side walls 50 and 51, as indicated at 47' in FIGURE 9, to extend through conforming openings or apertures provided in the bottom wall 48, so that electrical connections to the terminal pins of the heating element formations may be made below the bottom wall 48 and below or at least suitably laterally spaced from the gas burner 49, so that they will not be adversely affected by the heat from the gas flame. The rear wall of the oven liner for such gas oven installations will be made form a plain panel of sheet material in a similar manner to the rear wall for the electrically heated oven installations, the periphery of the rear wall panel being suitably secured as by welding or the like to the rear edges of the hood-like surround defined by liner stock 45.

It will be appreciated that the oven liner stock for either the electrically heated oven or gas heated oven installations hereinabove described may have the heating element formations 26 thereof oriented differently from the above-described examples. Obviously, the tubular conduit portions of the stock from which the oven liner surround is made may extend along parallel axes, extending perpendicular to the longitudinal axis of the oven liner stock rather than parallel to the longitudinal axis, thus disposing the heating element formations along axes paralleling the fore and aft axis of the oven rather than perpendicular to this fore and aft axis. In such cases, the sheath forming conduit portions of the oven liner stock should extend somewhat beyond the lateral edges of the stock in the finished product, as, for example, by cutting away the web portions intervening between the conduit portions for a short distance inwardly of the lateral edges of the oven liner stock, and these protruding end portions of the heating element formations should then be bent outwardly away from the center axis of the oven cavity to facilitate connection to the electrical supply leads for the heating elements.

It will be apparent from the foregoing description that the herein-described composite oven liner and integral heat-cleaning heating element construction provides a very versatile inner oven liner structure which is adapted to a wide variety of cooking oven applications. By incorporation of the heat-cleaning heating elements in the oven liner structure itself, exceedingly efficient transfer of heat to the oven liner is achieved, markedly facilitating elevation of the temperature of the inner oven liner to the appropriate level for removal of food soils from the interior surfaces of the liner, basically by degrading the food soils with production of corresponding gaseous degradation products, which may be readily exhausted to the exterior of the oven cavity through a suitable opening formed therein. Other specific applications than those particularly shown and described herein may be made, and it is therefore intended that only such limitations be placed on the invention as are imposed by the prior art and set forth in the appended claims.

What is claimed is:

1. A composite heat-cleaning oven liner for self-cleaning ovens with incorporated sheathed electric resistance oven-cleaning heaters forming a unitary surround defining the interior boundary surfaces of at least the top and sides of a cooking oven cavity having a fore-and-aft axis and selectively heated by the sheathed electric resistance heaters to temperatures above normal cooking temperatures for effecting heat removal of accumulated food soils on said boundary surfaces, comprising a unitary metallic oven liner sheet of continuous elongated sheet material bent to define a horizontal top liner wall and vertical side liner walls bounding the oven cavity and paralleling said axis, said sheet having transversely extending edges at the opposite ends thereof, said liner sheet in each of said walls including a plurality of inwardly deformed channel formations therein defining outwardly facing concave channels each extending continuously between said transverse edges in respective parallel paths lying in vertical planes spaced along said axis and the remaining portions of said liner sheet flanking said channels forming thin integral planiform web portions comprising a single layer of the sheet material extending over the major portion of each of said walls, metallic cover portions of sheet material outwardly overlying said channels in covering relation and joining said liner sheet along opposite lateral sides of the channels defining collectively with said channel formations laterally closed elongated tubular conduits therebetween having their interior surfaces formed by confronting surface portions of said channel formations and cover portions and extending continuously between said transverse edges, an elongated electrical resistance heating wire extending longitudinally within each of said conduits and having terminal pin portions at opposite ends thereof protruding to exposed positions beyond the opposite ends of the conduits for connection to external circuitry for heating said liner sheet to oven-cleaning temperatures, and a mass of compacted electrical insulating material within each of said conduits surrounding said heating wire in electrical insulating relation and directly contacting said confronting surface portions of said channel formations and of said cover portions whereby said channel formations and cover portions collectively form the metallic sheaths for said oven-cleaning heaters.

2. A composite heat-cleaning oven liner as defined in claim 1, wherein said oven liner sheet bent to define said liner walls has a length corresponding substantially to the perimeter of a transverse section of the oven cavity bent into a continuous surround of substantially rectangular configuration defining a bottom liner wall and said top and side walls of the oven cavity, and said opposite ends of said sheet adjacent said transversely extending edges forms vertically rising, laterally spaced flanges extending upwardly from the plane of said top liner wall and being located substantially midway between said side liner walls.

3. In a gas heated cooking oven having an oven cavity, a flame impingement bottom wall of substantially rectangular configuration lying in a substantially horizontal plane forming the bottom surface of said oven cavity, a composite heat-cleaning oven liner as defined in claim 1 forming the side and top surfaces of said oven cavity, said top and side liner walls defining an inverted U-shaped hood structure above said flame impingement bottom wall, the lower edge portions of said web portions of said side liner walls terminating adjacent said bottom wall, and said tubular conduits in said side liner walls extending selected distances below said bottom wall for connection of said terminal pin portions of the heating wires therein to said external circuitry at positions below said bottom wall.

4. A gas fired cooking oven as defined in claim 3, wherein said lower edge portions of the web portions of said side liner walls form outwardly extending flanges lying in parallel overlying relation to lateral edge portions of said bottom wall and are secured thereto.

References Cited
UNITED STATES PATENTS

| | | | |
|---|---|---|---|
| 2,035,757 | 3/1936 | Ottenstein | 219—407 |
| 2,678,990 | 5/1954 | Quirk | 219—406 |
| 3,137,924 | 6/1964 | Wilkins | 29—611 |
| 3,079,673 | 3/1963 | Loehlein et al. | 29—611 |
| 2,777,300 | 1/1957 | Palmer | 29—611 |
| 2,658,987 | 11/1953 | Ogden | 219—279 |
| 2,756,321 | 7/1956 | Pappas | 219—279 X |
| 2,908,234 | 10/1959 | Naylor | 219—279 X |

BERNARD A. GILHEANY, *Primary Examiner.*

H. B. GILSON, *Assistant Examiner.*

U.S. Cl. X.R.

219—279